United States Patent
Jensen

(10) Patent No.: US 7,608,131 B2
(45) Date of Patent: Oct. 27, 2009

(54) THREE FLOW ARCHITECTURE AND METHOD FOR AIRCRAFT OBIGGS

(75) Inventor: Bryan D. Jensen, Mission Viejo, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 566 days.

(21) Appl. No.: 11/336,363

(22) Filed: Jan. 20, 2006

(65) Prior Publication Data

US 2007/0054610 A1  Mar. 8, 2007

Related U.S. Application Data

(60) Provisional application No. 60/646,145, filed on Jan. 21, 2005.

(51) Int. Cl.
 *B01D 53/04* (2006.01)
 *B01D 53/22* (2006.01)

(52) U.S. Cl. .................... 95/11; 95/47; 96/4; 141/63; 141/64

(58) Field of Classification Search .............. 95/11, 95/47; 96/4; 141/63, 64, 1
See application file for complete search history.

(56) References Cited

U.S. PATENT DOCUMENTS

| | | | |
|---|---|---|---|
| 4,378,920 A | 4/1983 | Runnels et al. | |
| 4,397,661 A | 8/1983 | King et al. | |
| 4,556,180 A | 12/1985 | Manatt | |
| 5,013,331 A | 5/1991 | Edwards et al. | |
| 6,729,359 B2 | 5/2004 | Jones | |
| 6,739,359 B2 | 5/2004 | Jones et al. | |
| 6,739,400 B2 * | 5/2004 | Lessi et al. | ............. 169/46 |
| 7,374,601 B2 * | 5/2008 | Bonchonsky et al. | ......... 95/138 |
| 2004/0025507 A1 | 2/2004 | Leigh et al. | |
| 2004/0065778 A1 | 4/2004 | Jones | |
| 2005/0103193 A1 | 5/2005 | Lyons et al. | |
| 2005/0115404 A1 | 6/2005 | Leigh et al. | |

* cited by examiner

*Primary Examiner*—Robert A Hopkins
(74) *Attorney, Agent, or Firm*—Renner, Otto, Boisselle & Sklar, LLP

(57) ABSTRACT

An air separation system and method wherein the outlet of a primary air separation module (one or more modules or bundles of fiber membranes) is split into two flow paths, a low flow path and a high flow path. The outlet of a secondary air separation module (one or more modules or bundles of fiber membranes) is split into two flow paths, a mid flow path and a high flow path, the latter being joined with the high flow of the primary air separation module. Flow along the primary low flow passes through a low-flow orifice, flow along the secondary mid-flow path passes through a mid-flow orifice, and flow along the high flow paths of both the primary and secondary air separation modules is joined together for passage through a shutoff valve and a high flow orifice. This configuration allows for three different flow modes of operation.

21 Claims, 2 Drawing Sheets

THREE FLOW ARCHITECTURE AND METHOD FOR AIRCRAFT OBIGGS

RELATED APPLICATION DATA

This application claims the benefit of U.S. Provisional Application No. 60/646,145 filed Jan. 21, 2005, which is hereby incorporated herein by reference in its entirety.

FIELD OF THE INVENTION

The invention herein described relates generally to air separation systems and methods and particularly those that supply nitrogen enriched air to spaces to be inerted, such as the ullage space in an aircraft fuel tank.

BACKGROUND OF THE INVENTION

Aircraft have used on-board inert gas generating systems (OBIGGS) to protect against fuel tank explosions by replacing the potentially explosive fuel vapor/air mixture above the fuel in the ullage space of the tanks with nitrogen-enriched air (NEA). The NEA is generated by separating oxygen from local, ambient air and pumping the inert, oxygen impoverished NEA into the tanks.

Production of NEA typically is carried out by means of an apparatus relying on permeable membranes, or else on molecular sieves. The air separation apparatus is generally referred to as an air separation module (ASM). A selectively permeable membrane ASM typically comprises a bundle of hollow fiber membranes packaged in a cylindrical shell with an inlet and outlet at the ends of the shell, and a shell side vent port. When pressurized air enters the ASM shell and passes into the hollow fibers, both oxygen and nitrogen are separated from the air stream due to permeation through the fiber walls. However, since the fiber walls are more permeable to oxygen than nitrogen, the non-permeating gas stream becomes oxygen deficient and nitrogen enriched, while the permeating gas stream is oxygen enriched and nitrogen deficient. The oxygen enriched air (OEA) exits through the side vent port and can be recaptured, but often the OEA is considered a waste gas that is exhausted overboard. The remaining NEA flows out of the ASM via the outlet port and is distributed to the ullage space of the fuel tank or tanks for the purpose of inerting the fuel tanks and thereby reducing flammability. The ASM operates more efficiently, in terms of permeability of oxygen as the membrane temperature increases. The purity of the NEA is also dependent upon the pressure differential and pressure ratio across the hollow fiber membranes, as well as the NEA flow rate and membrane temperature.

In many if not most commercial airplane applications, pressurized air used for NEA generation will originate from either an engine bleed or from a cabin air pressure source. With an engine bleed pressure supply, compressed hot air is ducted from an engine bleed air supply line and then cooled by a heat exchanger to an optimal temperature for maximum ASM performance. This use of engine bleed air can decrease engine performance and can lead to increased fuel consumption. Accordingly, it is desirable to limit the amount of engine bleed air that is needed during the various segments of the aircraft flight profile and particularly during cruise.

The nitrogen that must be generated and sent to the fuel tank to maintain inertness varies greatly during a flight. During climb, the ambient pressure decreases as altitude increases. As a result, ullage gas in the fuel tank may be vented overboard to maintain pressure equilibrium or a specified pressure differential between the tank and the outside environment. During this phase of the flight, the amount of nitrogen required to maintain an inert condition within the fuel tank is relatively low. Likewise, during the cruise regime, altitude is held relatively constant and the amount of nitrogen required to maintain an inert condition is relatively low.

As an aircraft descends, the ambient pressure increases as the altitude decreases. Consequently, there is typically a large inrush of outside air into the ullage space during the descent regime. This is especially true for an airplane with an open fuel tank vent, which most commercial airplanes have. The inrush of atmospheric air at 21% oxygen by volume, can quickly raise the oxygen concentration in the ullage, thereby spoiling an inert tank. Thus, there is a high demand upon the inerting system to supply a flow of nitrogen to the fuel tank during the descent regime. In fact, much of the inerting system capacity is required only during descent.

The inerting of an airplane fuel tank thus presents a significant design challenge to provide an adequate level of inerting capacity at the lowest penalty to the airplane. The penalty to the airplane comes in the form of inerting system weight, parasitic losses and cooling losses. Each of these three elements requires the airplane to burn more fuel and/or carry less payload.

In a known OBIGGS architecture, plural ASMs are provided to allow for low NEA flow from a primary ASM during the cruise phase of an aircraft flight profile and high NEA flow from both the primary and one or more additional secondary ASMs during aircraft descent. During cruise, the primary ASM receives a steady flow of pressurized air at a controlled temperature, thereby maintaining the primary ASM at a desired operating temperature for providing a high purity NEA. The secondary ASMs, however, are idle.

Historically, OBIGGS have been implemented either with all ASMs operating through a single, flow control orifice during all phases of flight, or using a two-flow system with one or more ASMs operating in one flow mode for climb and cruise, and another flow mode for descent. While the two-flow system represents a significant improvement in overall system performance versus the single flow system, it still leaves a significant amount of available system performance untapped.

SUMMARY OF THE INVENTION

The present invention provides an air separation system and method wherein the outlet of a primary air separation module (one or more modules or bundles of fiber membranes) is split into two flow paths, a low flow path and a high flow path. The outlet of a secondary air separation module (one or more modules or bundles of fiber membranes) is split into two flow paths, a mid flow path and a high flow path, the latter being joined with the high flow of the primary air separation module. More particularly, flow along the primary low flow passes through a low-flow orifice, flow along the secondary mid-flow path passes through a mid-flow orifice, and flow along the high flow paths of both the primary and secondary air separation modules is joined together for passage through a shutoff valve and a high flow orifice. This configuration allows for three different flow modes of operation.

The addition of a third flow mode allows for one or more of the following new opportunities:

an ability to use the system in a mid-flow/high-purity mode during climb to provide rapid inerting of the tank during climb when bleed pressures are highest;

an ability to use the system in a mid-flow/high-purity mode during climb and/or cruise to provide an initial thermal conditioning cycle for the secondary air separation modules;

the ability to switch between mid-flow and high-flow modes during descent to more optimally match system output with demand, thereby reducing in-tank oxygen concentration at landing; and the ability to optimize the mid-flow mode for ground operation of the inerting system.

In a preferred implementation, these performance attributes can be achieved using only two flow control valves. In fact, a non-trivial improvement in inerting system performance and/or decrease in system size may be realized with the herein described three-flow architecture.

Accordingly, the present invention provides an inerting system comprising a main inlet for connection to an upstream source of pressurized air; a main outlet for connection to a space to be inerted; a primary air separation module for producing nitrogen-enriched air from pressurized air supplied thereto from the main inlet; at least one secondary air separation module for producing nitrogen-enriched air from pressurized air supplied thereto from the main inlet; and flow control components for operating the primary air separation module in a low flow mode for delivery of nitrogen-enriched air to the main outlet at a low flow rate, for operating both the primary and secondary air separation modules in a mid flow mode for delivery of nitrogen-enriched air to the main outlet at a mid flow rate higher than the low flow rate, and for operating both the primary and secondary air separation modules in a high flow mode for delivery of nitrogen-enriched air to the main outlet at a high flow rate higher than the mid flow rate.

In particular, the flow control components include a primary flow passage connecting an inlet of the primary air separation module to the inlet, a secondary flow passage connecting the secondary air separation module(s) to the inlet, a secondary flow control valve for permitting or shutting off flow of the pressurized air through the secondary air separation module(s), a low flow passage connecting an outlet of the primary air separation module to the main outlet, a mid flow passage connecting an output of each secondary air separation module to the main outlet, and a high flow passage connected between the outlets of the primary and secondary air separation modules and the main outlet, the high flow passage including a high flow control valve for permitting or shutting off flow from the primary and secondary air separation modules to the main outlet.

The low flow, mid flow and high flow passages preferably include low, mid and high flow restrictors (e.g. orifices) for providing low, mid and high flow rates in the low flow, mid flow and high flow passages, respectively. The outputs of the main and secondary air separation modules may be respectively connected by primary and secondary flow connecting passages to the high flow passage upstream of the high flow control valve, and the secondary flow connecting passage may include a check valve blocking reverse flow therethrough.

As a preferred system, the flow control components include a controller responsive to flight data information of the aircraft for operating the primary and secondary air separation modules in the mid flow mode during climb, the primary air separation module in the low flow mode during cruise, and the primary and secondary air separation modules in the high flow mode during descent. The controller may be operable in response to demand for nitrogen-enriched air to cycle the primary and secondary air separation modules between high and mid flow modes to match output flow with the demand for nitrogen-enriched air. Also, the controller may be responsive to flight data information for operating the primary and secondary air separation modules in the mid flow mode just prior to descent of the aircraft in order to warm the secondary air separation modules.

According to another aspect of the invention, an inerting method comprises the steps of operating a primary air separation module in a low flow mode for delivery of nitrogen-enriched air to a space to be inerted at a low flow rate, operating both the primary and one or more secondary air separation modules in a mid flow mode for delivery of nitrogen-enriched air to the space to be inerted at a mid flow rate higher than the low flow rate, and operating both the primary and secondary air separation modules in a high flow mode for delivery of nitrogen-enriched air to the space to be inerted at a high flow rate higher than the mid flow rate.

The low, mid and high flow rates may be determined by respective flow restrictors in flow passages connecting the primary and secondary air separation modules to the space to be inerted. The primary and secondary air separation modules are cycled through the low, mid and high flow modes preferably through control of only two flow control valves.

Further features of the present invention will become apparent to those skilled in the art upon reviewing the following detailed description and attached drawings.

DETAILED DESCRIPTION

Figure 1:
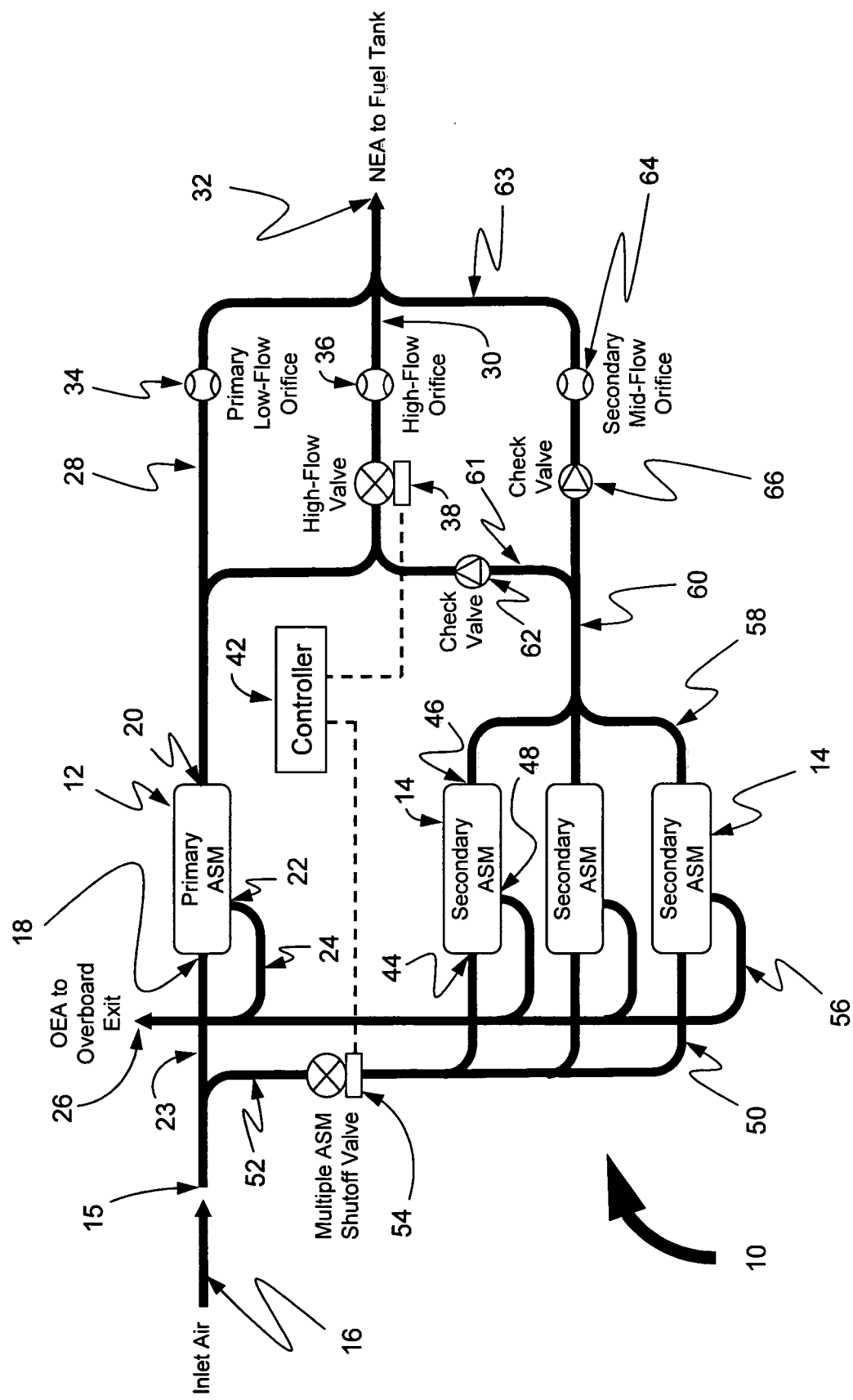
FIG. 1 is a schematic view of one embodiment of an air separation system according to the invention, which has particular application in an on-board inert gas generating system of an aircraft.

Referring now in detail to the drawings and initially to FIG. 1, an exemplary embodiment of an air separation system according to the invention is indicated generally by reference numeral 10. The illustrated system 10 is designed for use in an on-board inert gas generating system of an aircraft that supplies nitrogen-enriched air (NEA) to the fuel tank or tanks of an aircraft, and thus will chiefly be designed in this context. It will be appreciated, however, that the NEA can be used for inerting cargo holds and other void spaces in an aircraft. Moreover, the underlying principles of the invention have applicability to non-aircraft applications where a need exists for a supply of relatively inert, nitrogen-enriched air.

The system 10 generally comprises a primary air separation module 12 and one or more secondary air separation modules 14. Usually only one primary air separation module (ASM) will be utilized to produce nitrogen-enriched air (NEA) from a suitable supply source, although additional primary ASMs could be used if higher capacity is desired.

As discussed further below, the primary ASM can be operated in a low flow mode to supply high purity NEA to the ullage space of the aircraft fuel tanks at a rate sufficient to compensate for the increase in such ullage space as fuel is consumed from the tanks during the cruise segment of the aircraft flight plan.

During aircraft descent, substantially higher flow of NEA is needed. To provide this higher flow, the primary ASM can be operated in a high flow mode, and the one or more secondary ASMs can be operated to meet the flow requirements needed to maintain a non-explosive atmosphere in the fuel tanks, such as an oxygen level in the ullage space less than about 10%-14% oxygen, and more particularly less than about 12% oxygen, if not lower.

The system 10 is also uniquely operable in a mid flow mode to supply high purity NEA during climb to provide rapid inerting of the fuel tank(s) during climb when bleed pressures are greatest. In addition, the system can be operated in the mid flow mode during cruise to provide thermal conditioning of the secondary ASM's, either periodically throughout cruise or over a single time segment at the end of cruise, just prior to descent. As will also be appreciated, the system can be switched between mid flow and high flow during descent to more optimally match system output with demand, thereby reducing in-tank oxygen concentration at landing.

In the illustrated embodiment the system 10 has a main inlet 15 for connection to a continuous supply of air at elevated temperature and elevated pressure (conditioned air). Any suitable supply can be used, such as cabin pressure source or engine bleed air. Engine bleed air supplied from taps in the turbine section of the aircraft engines typically will be at too high a temperature for use by the ASM. For this reason, the engine bleed air can be cooled by passage through a heat exchanger (not shown) of a thermal control system 16. The bleed air can also be filtered to remove particulates, contamination, and/or moisture before passage to the primary and secondary ASMs 12 and 14.

The primary ASM 12, as well as the secondary ASMs 14, can be of any suitable type. In the illustrated system, the primary ASM is a selectively permeable membrane ASM. The primary ASM 12 includes a bundle of hollow fiber membranes packaged in a cylindrical shell with an inlet port 18 and outlet port 20 at the ends of the shell, and a shell side vent port 22. The inlet port 18 is connected by a flow passage 23 to the main inlet 15.

When pressurized air enters the ASM shell and passes into the hollow fibers, both oxygen and nitrogen are separated from the air stream due to permeation through the fiber walls. However, since the fiber walls are more permeable to oxygen than nitrogen, the non-permeating gas stream becomes oxygen deficient and nitrogen enriched, while the permeating gas stream is oxygen enriched and nitrogen deficient. The oxygen enriched air (OEA) exits through the side vent port 22 and can be recaptured, although more often the OEA will be exhausted overboard via an exhaust line 24 connected to an overboard exhaust 26. The remaining NEA flows out of the ASM via the outlet port 20.

In the illustrated exemplary system, the outlet port 20 is connected by parallel-connected lines 28 and 30 to a main outlet 32 that can be connected by one or more flow lines to the aircraft fuel tank or tanks. A low flow orifice 34 (or other suitable flow restriction device) is provided in line 28, which is herein also referred to as a low flow line or passage. The other line 30, herein also referred to as a high flow line or passage, is provided with a high flow orifice 36 (or other suitable flow restriction device) and a high flow control valve 38. The high flow control valve 38 may be of any suitable type, such as a solenoid valve, and is controlled by a controller 42.

During aircraft cruise the primary high flow control valve 38 will be closed so that the outlet flow of the primary ASM 12 passes through the low flow orifice 34 that is sized to provide a desired flow rate through the primary ASM for optimal efficiency. At lower flow rates a high nitrogen purity can be achieved, with oxygen making up for example only about one percent by volume of the NEA. If desired the low flow orifice 34 can be a stepped or variable orifice and an oxygen sensor (not shown) can be provided to provide signals representing oxygen content of the NEA, which signals can be used to control the orifice size to provide NEA having a dynamically controlled level of purity. It will be appreciated, however, that adequate system performance will typically be attainable without the added cost of a variable orifice and oxygen level feedback loop.

For aircraft descent (or other high flow period), the high flow control valve 38 will be commanded open by the controller 42 to allow the output of the primary ASM 12 to flow not only through the low flow orifice 34 but also through the high flow orifice 36 that permits higher flow rates than obtained when output flow is directed only through the primary low flow orifice 34. At the higher flow rate the oxygen content of the NEA will be higher, such as about ten to fifteen percent by volume.

During aircraft descent (or other "high flow period" where a high flow rate of NEA is needed for inerting purposes) the output of the primary ASM 12 is supplemented by the secondary ASMs 14. The secondary ASMs 14 each can be a selectively permeable membrane ASM and thus each has an inlet port 44, outlet port 46 and side vent port 48. The inlet ports 44 of the secondary ASMs are connected by respective branch inlet lines 50 to a secondary supply line 52 that in turn is connected to the main inlet 15. The secondary supply line 52 is provided with a secondary inlet flow control valve 54 that controls the supply of the conditioned air to the secondary ASMs. The secondary inlet flow control valve 54 may be of any suitable type, such as a solenoid valve, and is controlled by the controller 42.

The side vent ports 48 of the secondary ASMs are connected to branch vent lines 56 leading to the overboard exhaust 26. The outlet ports 46 of the secondary ASM's 14 are connected by respective branch outlet lines 58 to a secondary outlet flow line 60.

The secondary outlet flow line is connected by a branch line 61 to the high flow line 30 which branch line 61 is provided with a check valve 62 to prevent back-flow. The secondary outlet flow line is also connected to a mid flow passage or line 63 which in turn is connected to the main outlet. The mid flow line 63 is provided with a mid flow orifice 64 (or other suitable flow restriction device) for providing a flow rate between the flow rates afforded by the low and high flow orifices. The mid flow line 63 is also provided with a check valve 66 to prevent reverse flow therethrough.

In operation, the secondary inlet flow control valve 54 and the high flow control valve 38 can be closed so that pressurized air is supplied only to the primary ASM 12. In addition, flow of nitrogen-enriched air from the primary ASM will be directed only through the low flow line which includes the low flow orifice. This corresponds to the low flow mode of operation of the system.

The system can be operated in the high flow mode by opening both control valves 38 and 54. Consequently, high pressure air will be supplied to the primary and secondary ASMs 12 and 14. The output of the primary and secondary ASM's 12 and 14 will flow through the low flow orifice 34, the mid flow orifice 64, and the high flow orifice 36, permitting higher flow rates than obtained when output flow is directed only through the primary low flow orifice 34.

The third operational mode, i.e. the mid flow mode, is obtained when the secondary inlet flow control valve 54 is open and the high flow control valve 38 is closed by the controller. Like in the high flow mode, high pressure air will be supplied to the primary and secondary ASMs 12 and 14. Unlike the high flow mode, the output of the primary ASM 12 will flow only through the low flow orifice 34, and the output of the secondary ASM's will flow only through the mid flow orifice 64, thereby providing an intermediate flow level.

Figure 2:
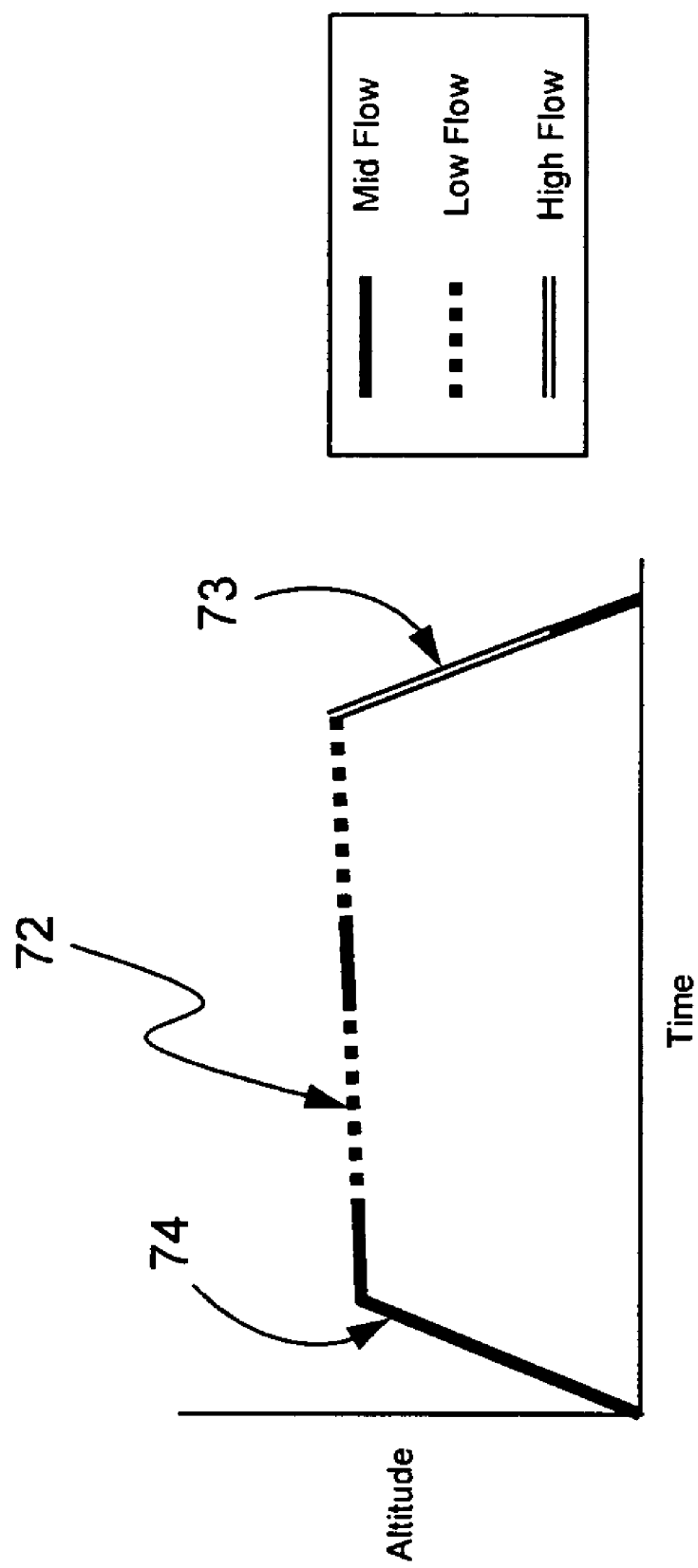
FIG. 2 is a graphical illustration of an exemplary flow mode utilization according to the invention.

With the foregoing architecture and as illustrated in FIG. 2, low NEA flow may be provided from the primary ASM 12 during the cruise phase 72 of an aircraft flight profile and high NEA flow from both the primary and the secondary ASMs 12 and 14 during aircraft descent. During descent 73, the system can be cycled between its high and mid flow modes as may be desired to more optimally match system output to demand. During ascent 74 the system may be operated in the mid flow mode to provide rapid inerting of the fuel tank or tanks when bleed pressures are the highest.

The controller, further in response to flight data information received for example from the aircraft's air data computer, altimeter, or vertical speed indicator, may also command the system to cycle between low and mid flow modes during cruise. This can provide for periodic warming of the secondary ASMs while still maintaining a sufficiently low oxygen concentration in the fuel tank or tanks. The mid flow rate can be set to be such that the low purity NEA that will pass to the fuel tanks during warming of the secondary ASMs will be below a rate that would cause the oxygen concentration to attain an unacceptable level, as would otherwise occur if the system shifted to the high flow mode at the start of aircraft descent.

Optionally, provision may be made for a warming flow dump circuit. During warming flow through the secondary ASMs, the warming flow dump circuit would vent the ASM product flow back to the atmosphere rather than into the fuel tank. At least one additional valve would be needed to implement this modification. Reference may be had to U.S. patent application Ser. No. 10/946,899 filed Sep. 22, 2004 for an implementation of a warming flow dump circuit, which application is hereby incorporated herein by reference in its entirety.

Although reference is herein made to air separation modules, the "modules" can be discrete as illustrated or can be integrated into a larger module. That is, the functionality of the primary and secondary modules can be implemented by segmenting different flow paths in a single composite module, if desired. Also, the various inlets, lines, passages and the like herein referenced can be composed of single inlet, line, passage, etc. or plural inlets, lines, passages, etc. providing the same functionality. For instance, the main inlet 15 may comprise one or more ports providing for connection to one or more sources of pressurized air.

The controller that handles flow mode switching may be a suitably programmed computer or other processor. In addition, the controller may be or include other means for accomplishing flow mode switching, such as but not limited to a clock or timer, a rate-of-change-of-altitude sensitive pressure switch, an input from flight deck personnel, etc.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An inerting system, comprising:
   a main inlet for connection to an upstream source of pressurized air;
   a main outlet for connection to a space to be inerted;
   a first air separation module for producing inert gas-enriched air from pressurized air supplied thereto from the main inlet;
   at least one second air separation module for producing inert gas-enriched air from pressurized air supplied thereto from the main inlet; and
   flow control components for operating the first air separation module in a low flow mode for delivery of inert gas-enriched air to the main outlet at a first flow rate, for operating both the first and second air separation modules in a mid flow mode for delivery of inert gas-enriched air to the main outlet at a second flow rate higher than the first flow rate, and for operating both the first and second air separation modules in a high flow mode for delivery of inert gas-enriched air to the main outlet at a third flow rate higher than the second flow rate.

2. An inerting system according to claim 1, wherein the flow control components include a first flow passage connecting an inlet of the first air separation module to the inlet, a second flow passage connecting the second air separation module(s) to the inlet, a second flow control valve for permitting or shutting off flow of the pressurized air through the second air separation module(s), a low flow passage connecting an outlet of the first air separation module to the main outlet, a mid flow passage connecting an output of each second air separation module to the main outlet, and a high flow passage connected between the outlets of the first and second air separation modules and the main outlet, the high flow passage including a high flow control valve for permitting or shutting off flow from the first and second air separation modules to the main outlet.

3. An inerting system according to claim 2, wherein the low flow, mid flow and high flow passages include low, mid and high flow restrictors for providing low, mid and high flow rates in the low flow, mid flow and high flow passages, respectively.

4. An inerting system according to claim 2, wherein the outputs of the first and second air separation modules are respectively connected by first and second flow connecting passages to the high flow passage upstream of the high flow control valve, and the second flow connecting passage includes a check valve blocking reverse flow therethrough.

5. An inerting system according to claim 2, wherein the mid flow passage includes a check valve preventing reverse flow therethrough.

6. An inerting system according to claim 1, including a warming flow bypass line connected to the second air separation module(s) for diverting a warming flow through the second air separation module(s) away from the main outlet.

7. An inerting system according to claim 6, comprising a warming flow control valve for controlling flow through the bypass line.

8. An inerting system according to claim 1, wherein the flow control components include a controller responsive to flight data information of the aircraft for operating the first and second air separation modules in the mid flow mode during climb, the first air separation module in the low flow mode during cruise, and the first and second air separation modules in the high flow mode during descent.

9. An inerting system according to claim 8, wherein the controller is operable in response to demand for inert gas-enriched air to cycle the first and second air separation modules between high and mid flow modes to match output flow with the demand for inert gas-enriched air.

10. An inerting system according to claim 8, wherein the controller is responsive to flight data information for operating the first and second air separation modules in the mid flow mode just prior to descent of the aircraft in order to warm the second air separation modules.

11. An inerting system according to claim 8, wherein the mid-flow mode is used periodically (duty cycled) during cruise to keep the second air separation module's warm.

12. An inerting system as set forth in claim 1, in combination with an aircraft including a fuel tank to which the main outlet is connected.

13. An inerting method comprising the steps of operating a first air separation module in a low flow mode for delivery of inert gas-enriched air to a space to be inerted at a first flow rate, operating both the first and one or more second air separation modules in a mid flow mode for delivery of inert gas-enriched air to the space to be inerted at a second flow rate higher than the first flow rate, and operating both the first and second air separation modules in a high flow mode for delivery of inert gas-enriched air to the space to be inerted at a third flow rate higher than the second flow rate.

14. A method according to claim 13, wherein the first, second and third flow rates are determined by respective flow restrictors in flow passages connecting the first and second air separation modules to the space to be inerted.

15. A method according to claim 13, wherein a warming flow of pressurized air at elevated temperature is provided through the second air separation module to heat the second air separation module to above ambient temperature during a period other than the high flow mode.

16. A method according to claim 15, wherein during the warming period flow from the second air separation module (s) is diverted by a bypass line away from the space to be inerted.

17. A method according to claim 13, wherein the first and second air separation modules are cycled through the low, mid and high flow modes through control of only two flow control valves.

18. An inerting system, comprising:
an inlet for connection to an upstream source of pressurized air;
an outlet for connection to a space to be inerted; and
air separation means connected between the inlet and outlet for delivery of inert gas-enriched air to the outlet at a first flow rate in a low flow mode, for delivery of inert gas-enriched air to the outlet in a mid flow mode at a second flow rate higher than the first flow rate, and for delivery of inert gas-enriched air to the main outlet in a high flow mode at a third flow rate higher than the second flow rate.

19. A flow control apparatus for an inerting system including a main inlet for connection to an upstream source of pressurized air, a main outlet for connection to a space to be inerted, a first air separation module for producing inert gas-enriched air from pressurized air supplied thereto from the main inlet, and at least one second air separation module for producing inert gas-enriched air from pressurized air supplied thereto from the main inlet, said apparatus comprising flow control components for effecting operation of the first air separation module in a low flow mode for delivery of inert gas-enriched air to the main outlet at a first flow rate, for effecting operation of both the first and second air separation modules in a mid flow mode for delivery of inert gas-enriched air to the main outlet at a second flow rate higher than the first flow rate, and for effecting operation of both the first and second air separation modules in a high flow mode for delivery of inert gas-enriched air to the main outlet at a third flow rate higher than the second flow rate.

20. An apparatus according to claim 19, wherein the flow control components include a flow control valve for permitting or shutting off flow of the pressurized air through the second air separation module(s), a low flow passage for connecting an outlet of the first air separation module to the main outlet, a mid flow passage for connecting an output of each second air separation module to the main outlet, and a high flow passage for connecting between the outlets of the first and second air separation modules and the main outlet, the high flow passage including a high flow control valve for permitting or shutting off flow from the first and second air separation modules to the main outlet.

21. An apparutus according to claim 20, wherein the low flow, mid flow and high flow passages include low, mid and high flow restrictors for providing low, mid and high flow rates in the low flow, mid flow and high flow passages, respectively.

* * * * *

UNITED STATES PATENT AND TRADEMARK OFFICE
CERTIFICATE OF CORRECTION

PATENT NO.         : 7,608,131 B2                                                Page 1 of 1
APPLICATION NO.    : 11/336363
DATED              : October 27, 2009
INVENTOR(S)        : Bryan D. Jensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Twelfth Day of October, 2010

David J. Kappos
*Director of the United States Patent and Trademark Office*